Aug. 2, 1932. J. SNARCK Re. 18,550
FAGOTING EMBROIDERY AND METHOD OF MANUFACTURING SAME
Original Filed Dec. 26, 1931
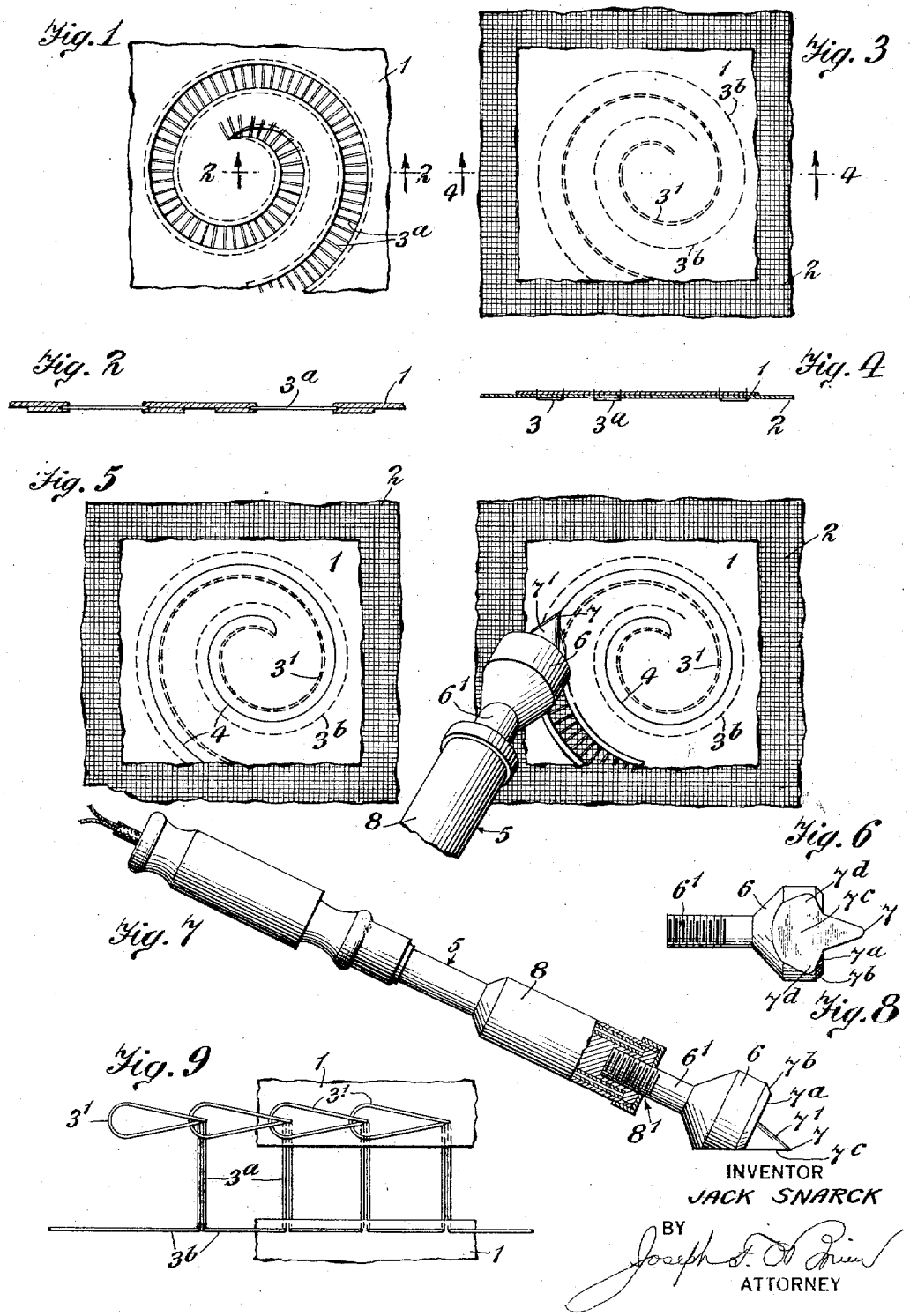
INVENTOR
JACK SNARCK
BY
Joseph T. O'Brien
ATTORNEY Reissued Aug. 2, 1932 Re. 18,550

UNITED STATES PATENT OFFICE

JACK SNARCK, OF NEW YORK, N. Y., ASSIGNOR OF ONE-HALF TO CHARLES HARRISON, OF BROOKLYN, NEW YORK

FAGOTING EMBROIDERY AND METHOD OF MANUFACTURING SAME

Original No. 1,855,003, dated April 19, 1932, Serial No. 583,330, filed December 26, 1931. Application for reissue filed June 10, 1932. Serial No. 616,564.

This invention relates to improvements in fagoting embroidery and methods of manufacturing same.

One of the objects of this invention is to provide a method and apparatus for producing fagoting embroidery with great speed and economy; to produce a method whereby a subsequently dischargeable fabric is employed to provide an interposed protective foundation or element between the fagoting cross-threads and the embroidery fabric so as to enable the cutting and edge-folding tools to be rapidly and quickly manipulated to sever or slit fabric traversely of such cross-threads and to fold over the severed edges without danger of severing or otherwise injuring the cross-threads or stitches; to provide a method and apparatus by the use of which the severed edges of slit in the embroidery fabric may be, in one operation, neatly and quickly opened up, folded over and initially ironed in preparation for subsequent pressing and fastening down.

With these and other objects in view, the invention comprises the combination of members and arrangement of parts so combined as to co-act and co-operate with each other in the performance of the functions and the accomplishment of the results herein contemplated, and comprises in one of its adaptions the species or preferred form illustrated in the accompanying drawing, in which:—

Fig. 1 is a view in plan of a finished piece of fagoting embroidery embodying my invention;

Fig. 2 is a section on the line 2—2 of Fig. 1, looking in the direction of the arrow;

Fig. 3 is a view in plan of the reverse side of a piece of material or fabric mounted upon vanishing fabric and stitched with a fagoting stitch;

Fig. 4 is a section on the line 4—4 of Fig. 3 looking in the direction of the arrow;

Fig. 5 is a view similar to Fig. 3 showing the embroidered material slit intermediate the cross-threads of the fagoting stitch;

Fig. 6 is a view similar to Figs. 3 and 5 showing the edges of the slit fabric initially folded by a novel turning and pressing or folding element;

Fig. 7 is a side elevation of a novel tool employed in slit-opening, edge turning and initial hot-pressing or ironing;

Fig. 8 is a bottom view in plan of the tool shown in Fig. 7;

Fig. 9 is an enlarged detail view of the fagoting embroidery stitch preferably employed by me.

Referring now to the drawing which illustrates a preferred embodiment of my invention, 1 indicates a single, unfolded piece of fabric or material to be embroidered, which I shall hereinafter call "an embroidery fabric", 2 indicates a piece of heat-dischargeable fabric, adapted on subjection to heat to be discharged and to be brushed away, and which, in the preferred embodiment of my invention, I utilize as a protective foundation fabric or protective element. As illustrated in Figs. 3 and 4, the embroidery fabric is superposed over the heat-dischargeable fabric with the front face of the embroidery fabric abutting the dissolvable fabric, and fagoting-embroidery stitch, preferably such as shown in Fig. 9, is stitched through both of said fabrics to produce a suitable design of any bent or curvi-form configuration and composed of two rows of parallel longitudinal stitches having cross-threads extending between the same and all formed or arranged in a singe plane. My preferred stitch, 3, comprises a chain-stitch portion 3′, fagoting cross-threads 3*a* and connecting stitch portion 3*b*. When this stitch is made in the superposed embroidery fabric and dischargeable fabric, only the cross-threads 3*a* pass through the fabric and extend beneath or on underside or bottom of the dissolvable fabric 2 and these fagoting embroidery threads will thus, as hereinafter described, be protected by this dischargeable fabric, which is stiff and tough, during the further operations on the fabric.

The stitch 3 being made through the embroidery fabric and the protecting heat-dischargeable element 2, the portion of embroidery fabric extending over the cross-threads and between the parallel edge-stitch portions 3′ and 3*b* may be slit, as shown at 4 in Figs. 5 and 6 by a pair of scissors, a knife or in any other suitable manner, and in this slitting operation, the heat-dissolvable protective element 2, being disposed between the fabric 1 and the cross-threads 3*a* will serve as a protective foundation to prevent engagement and severing of cross-threads by the severing tool, thus permitting greater speed in manufacturing than would otherwise be possible.

After the fabric is slit as shown at 4 in Figs. 5 and 6, I open up the slit, turn over the edge and initially iron or hot-press the same, and for this purpose, I utilize a novel device combining in one tool a slit-opener, edge turner and initial hot presser.

The slit-opening portion of this tool is inserted in the slit and upon sliding the tool along through the slit on the dischargeable fabric I turn or fold outwardly and downwardly in opposite directions the marginal edges adjacent to the slit and in the same operation I iron or hot-press these edges so as to cause such edges to initially retain their folded position.

As illustrated in Figs. 6 to 8 inclusive, I utilize a tool having a pointed and upwardly inclined portion which is preferably semi-conic in configuration and is adapted for ready insertion in the slit to cause a raising of the fabric edges and this pointed semi-conic or upwardly inclined portion merges with another portion for turning down such edges, and said tool also provides means for the initial pressing or ironing of such edges so as to cause them to maintain their folded condition.

As illustrated, my novel tool 5 includes a metallic head 6, having a pointed insertion portion 7 provided with an upwardly-inclined surface 7′ merging with a reversely-inclined wall portion 7*a* serving as a turning portion. Said wall portion 7*a* is slightly inclined in the opposite direction and has a bevelled edge 7*b*. This bevel-edged wall 7*a* preferably surrounds the semi-conic pointed nose, constituting a major circumference merging at its lower end with a flat bottom portion 7*c* which preferably extends outwardly to provide pressing wing portions beneath which the fabric margin is lead to permit hot pressing. This flat surface also preferably merges or extends to the point 7. Suitable means is employed for supplying heat to the tool 5 and in the embodiment shown, the head 6 is provided with a shank 6′ which screws into a handle 8. The handle 8 has a suitable socket 8′ and contains an electric heating element of conventional form.

In using the tool 5, the pointed insertion-portion 7 is, as above indicated, inserted in the slit, the flat portion 7*c* being passed along between the edges 3′—3*b* of the stitch 3 and over the protecting fabric 2 and forming a guide for the semi-conic opening surface 7′. This portion 7′ lifts and opens the marginal edges of the slit and these edges upon reaching the bevelled wall 7*a* are turned outwardly and downwardly beneath the outer wing portions 7*d* which merges with the flat portion 7*c*. The heating of the heating element thereupon supplies the necessary heat and pressing or ironing means to initially retain said folded portion in folded condition.

After initially folding down the marginal edges as above described, I apply on the reverse side of the fabric beneath the folded edges of the slit a conventional fastening material such as rubber, which is sprayed beneath said initially folded marginal edges by the use of conventional spraying apparatus.

The embroidered fabric is then, preferably in one operation or simultaneously, subjected to heat and pressure which not only securely fastens down the said marginal edges but also serves to discharge the protective dischargeable fabric which, after such pressing and heating may be brushed away to leave the open fagoting channel with the cross-threads only of fagoting stitches exposed at the front side as shown in Fig. 1, while the parallel chain and connecting stitch portions 3′, 3*b* are concealed on the reverse side by the fastened down marginal edges of the slit.

As many changes could be made in the above construction and many apparently widely different embodiments of this invention could be made without departing from the scope thereof; it is intended that all matter contained in the above description or shown in the accompanying drawing shall be interpreted as illustrative and not in a limiting sense.

Having described my invention, I claim:—

1. The method of manufacturing fagoting embroidery consisting in embroidering a single piece of material with two rows of parallel stitches and cross-threads extending between such stitches, slitting the fabric between such parallel rows of stitching, and in a single operation folding down the edges of the slitted portion in opposite directions over the parallel rows of stitching to conceal the same and applying heat to said edges to retain the same in folded position.

2. The method of manufacturing fagoting embroidery consisting in taking a piece of fabric to be embroidered, superimposing the same on a piece of fabric dischargeable by heat, applying a fagoting embroidery stitch through said fabric to be embroidered and through said dischargeable fabric to cause longitudinal parallel rows of stitches to be exposed on one side of said embroidered fabric and cross-stitches to be exposed on the opposite side of the dischargeable fabric, slitting said embroidered fabric between said exposed two longitudinal rows of stitches and above said dischargeable fabric, folding the edges of the slitted portion downwardly to conceal the rows of stitches and simultaneously turning over the edges of the slitted portion and ironing the same in a single operation to initially retain the same in folded condition and then simultaneously subjecting said fabric to heat and pressure to discharge the dischargeable material and to press the folded edges.

3. The method of manufacturing fagoting embroidery consisting in taking a piece of fabric to be embroidered, superimposing the same on a piece of fabric dischargeable by heat, applying a fagoting embroidery stitch through said fabric to be embroidered and through said dischargeable fabric to cause parallel longitudinal rows of stitches to be exposed on one side of said embroidery fabric and cross-stitches to be exposed on the opposite side of the dischargeable fabric, slitting said embroidery fabric between said exposed two longitudinal rows of stitches and above said dischargeable fabric, folding the edges of the slitted portion downwardly to conceal the longitudinal rows of stitches and in the same operation simultaneously turning over the edges of the slitted portion to retain such edges in initially folded condition, spraying under the folded edge portions a fastening material and then simultaneously subjecting said fabric to heat and pressure to discharge the dischargeable material and to press the folded edges.

4. Fagoting embroidery embodying, in combination, a single piece of fabric, a stitch embroidered in said fabric in an ornamental curvi-form design of any suitable configuration and comprising two rows of parallel longitudinal stitches both arranged completely on one face of the fabric and cross-threads passing through the fabric to the opposite face of the fabric, said fabric having an open channel between said parallel longitudinal stitches to expose the cross-threads and having the edges of the fabric at each side of the channel folded down over the said rows of longitudinal stitches to conceal the same.

In testimony whereof, I have signed my name to this specification.

JACK SNARCK.